US008873545B2

(12) United States Patent
Ozawa

(10) Patent No.: US 8,873,545 B2
(45) Date of Patent: Oct. 28, 2014

(54) GATEWAY APPARATUS, SYSTEM AND METHOD

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 245 days.

(21) Appl. No.: 13/147,978

(22) PCT Filed: Feb. 15, 2010

(86) PCT No.: PCT/JP2010/052178
§ 371 (c)(1),
(2), (4) Date: Aug. 4, 2011

(87) PCT Pub. No.: WO2010/093037
PCT Pub. Date: Aug. 19, 2010

(65) Prior Publication Data
US 2011/0292878 A1 Dec. 1, 2011

(30) Foreign Application Priority Data

Feb. 16, 2009 (JP) ................................ 2009-033045
Mar. 25, 2009 (JP) ................................ 2009-074884

(51) Int. Cl.
*H04L 12/66* (2006.01)
*H04W 88/16* (2009.01)
*H04W 88/12* (2009.01)
*H04W 84/04* (2009.01)

(52) U.S. Cl.
CPC ............. *H04L 12/66* (2013.01); *H04W 88/16* (2013.01); *H04W 88/12* (2013.01); *H04W 84/045* (2013.01)
USPC ........................... 370/352; 455/403; 709/249

(58) Field of Classification Search
None
See application file for complete search history.

(56) References Cited

U.S. PATENT DOCUMENTS

| 2003/0026245 A1* | 2/2003 | Ejzak ............................ 370/352 |
| 2003/0128696 A1* | 7/2003 | Wengrovitz et al. .......... 370/352 |
| 2004/0005886 A1* | 1/2004 | Oda et al. .................... 455/422.1 |
| 2005/0201336 A1* | 9/2005 | Lee ............................... 370/335 |
| 2006/0083199 A1* | 4/2006 | Yang ............................. 370/331 |
| 2006/0133352 A1* | 6/2006 | Chang ........................... 370/352 |

(Continued)

FOREIGN PATENT DOCUMENTS

| EP | 1933511 A1 | 6/2008 |
| GB | 2450322 A | 12/2008 |

(Continued)

OTHER PUBLICATIONS

International Search Report for PCT/JP2010/052178 mailed May 18, 2010.

(Continued)

*Primary Examiner* — Brian Roberts
(74) *Attorney, Agent, or Firm* — Sughrue Mion, PLLC

(57) ABSTRACT

A gateway apparatus receives a call control signal and/or a packet that has voice data stored therein in a predetermined protocol or payload format from an access point, converts a protocol of the call control signal and/or a protocol or payload format of the packet into a circuit switched protocol used when an RNC connects to the circuit switching equipment for output to the circuit switching equipment, receives a call processing signal that uses the protocol as that used when the circuit switching equipment outputs to the RNC and a voice signal that uses the same protocol, converts protocol of the call processing signal and/or the voice signal for output to the access point.

11 Claims, 7 Drawing Sheets

(56) References Cited

U.S. PATENT DOCUMENTS

| | | | |
|---|---|---|---|
| 2008/0146208 A1* | 6/2008 | Ejzak et al. | 455/416 |
| 2008/0198874 A1* | 8/2008 | Matsushima | 370/466 |
| 2009/0156213 A1* | 6/2009 | Spinelli et al. | 455/436 |
| 2009/0219888 A1* | 9/2009 | Chen et al. | 370/331 |
| 2009/0252118 A1* | 10/2009 | Nasielski et al. | 370/331 |

FOREIGN PATENT DOCUMENTS

| | | |
|---|---|---|
| JP | 2004032319 A | 1/2004 |
| JP | 2004222009 A | 8/2004 |
| JP | 2005072973 A | 3/2005 |
| JP | 2007524257 A | 8/2007 |
| JP | 2008512958 A | 4/2008 |
| WO | 2006043318 A | 4/2006 |
| WO | 2007040085 A | 4/2007 |

OTHER PUBLICATIONS

Supplementary European Search Report for EP 10 74 1314 completed Jan. 31, 2012.

Masato Ohnishi, "Feasibility study of handover between IMS/MMD-Femto system and Circuit Switched (CS)", Proceeding of the Society Conference of IEICE 2008, Sep. 2, 2008, p. 43. See cited reference 1 on p. 1 of Translated JPOA for explanation of relevance.

Japanese Office Action for JP Application No. 2010-550567 mailed on Jun. 11, 2013 with Partial English Translation.

* cited by examiner

GATEWAY APPARATUS, SYSTEM AND METHOD

DESCRIPTION OF RELATED APPLICATION

The present invention is based upon and claims the benefit of the priorities of Japanese patent applications No. 2009-033045 filed on Feb. 16, 2009 and No. 2009-074884 filed on Mar. 25, 2009, the disclosures of which are incorporated herein in their entirety by reference thereto.

TECHNICAL FIELD

The present invention relates to a gateway apparatus, method and program, and particularly to an apparatus, method and program connecting access points such as a femtocell, Home NodeB, and Home eNodeB to a circuit switching equipment on a mobile circuit switched network via a gateway and realizing interconnection between VoIP voice on an access point and voice telephony on a mobile circuit switched network.

BACKGROUND

Currently, in a mobile telephone terminal and mobile network using the third generation W-CDMA technology, a voice telephony service is implemented as follows: A radio base station receives a signal from a mobile telephone and a radio network controller (RNC) collects these signals and connects them to a circuit switching equipment on a mobile circuit switched network using a circuit switched protocol.

With research and development of high-speed and large-capacity technology for mobile network, the future trend of mobile network is towards achieving higher speed and larger capacity based on the IP. At the present time, HSDPA (High Speed Downlink Packet Access), HSPA (High Speed Packet Access), EVDO Rev. A, and EVDO Rev. B have already been put to practical use.

In the near future, progress of high speed network will be achieved. The trend is that the LTE (Long Term Evolution), EPC (Evolved Packet Core), UMA (Ultra Mobile Access), Mobile WiMax (WiMax is a trademark of WiMax Forum), or the like aiming at 100 Mbps (Mega bits per second) or more in downlink direction and at 50 Mbps or more in uplink direction will be introduced.

Further, the future trend is that an access point such as a femtocell, Home NodeB, Home eNodeB, or the like will be installed in home and voice call traffic each in home and enterprise will be supported via a mobile high-speed network.

In case an access point is such as a femtocell, Home NodeB, Home eNodeBs, or the like, VoIP (Voice over IP) based voice communication is used between the access point and a terminal connected thereto.

Patent Document 1, found by the present applicant in a prior art document search on a gateway, discloses a heterogeneous network connection gateway that connects a first network and a second network using a signal format different from the first network and comprises a conversion unit which converts a signal used in the first network into a signal used in the second network and which converts the signal used in the second network into the signal used in the first network when a terminal connected to the first network and a terminal connected to the second network communicate with each other; a detector that detects conversion process information including at least one of the following information items: time needed for the conversion unit to convert a signal or an amount of data converted; and a network connection unit that is connected to at least one of the first network and the second network and that transmits the conversion process information to a billing system of the first network or the second network; and the conversion unit that converts at least one of a call processing signal by call connection signaling, an audio signal generated by an audio codec, and an image signal generated by an image codec.

Further, Patent Document 2 discloses a configuration of a multimedia information replay system, in which conversion control means holds an attribute conversion table indicating conversion process contents only when multimedia information received from a first multimedia communication terminal cannot be provided to a second multimedia communication terminal, unless (an attribute such as coding system, coding rate, and multiple parameters of) the multimedia information is converted, and video conversion means and audio conversion means convert video information and audio information included in the multimedia information received from the first multimedia communication terminal according to the conversion process contents indicated by the attribute conversion table and provides the converted information to the second multimedia communication terminal.

Further, as a gateway, Patent Document 3 discloses a configuration of a communication system (SYS) in which an IPv4 private network (IPv4), global IPv4 Internet (IN) and IPv6 network (GV6) are interconnected through a first (AGW) and second (BGW) gateway, "IPv6 in IPv4 tunnels" are set up through the IPv4 private network (PV4) and the global IPv4 Internet (IN) in order to allow communication from a first fixed terminal (A1) of the IPv4 private network (PV4) to a second fixed terminal (B) of the IPv6 network (GV6), mapping tables in the first (AGW) and second (BGW) gateway can be set up and are used in the communication between the first terminal (A1) and the second terminal (B) on the basis of a global IPv6 address assigned to the first dual-stack terminal (A1), the usage of tunnels in particular avoid the usage of a Virtual Private Network (VPN) for the communication initiated from the first terminal (A1) to the second terminal (B).

Further, regarding security management by a server and gateway, Patent Document 4 discloses a configuration of a system for dynamic filtering of a data packet at an access gateway in a communication network in which a policy server receives a request for registration with the network from a network node, the server verifies the network node identity and selects the corresponding security policy for the network node, the selected security policy is indicated by the server to a network access gateway; the network access gateway selects the indicated security policy, and the selected security policy is applied for the communication between the network node and the network.

None of Patent Documents 1 to 4 mentioned above discloses a configuration of a gateway that interconnects an access point such as a femtocell, HNB (Home NodeBs), HeNB (Home eNodeB) and so force to a second gateway apparatus that connects a mobile circuit switched network and an IMS network, and that realizes interconnection between voice communication on an access point, voice communication on the mobile circuit switched network, and voice communication on the IMS network. The inventions described in Patent Documents 1 to 4 are entirely different from the present invention described below.

[Patent Document 1]
Japanese Patent Kokai Publication No. JP-P2004-222009A
[Patent Document 2]
Japanese Patent Kokai Publication No. JP-P2005-072973A
[Patent Document 3]
Japanese Patent Kohyo Publication No. JP-P2007-524257A
[Patent Document 4]
Japanese Patent Kohyo Publication No. JP-P2008-512958A

SUMMARY

An analysis by the present invention will be given below.

A VoIP terminal, which is predicted to be widespread in the near future, and connected to an access point such as a femtocell, Home NodeB, Home eNodeB or the like, and performs VoIP operation in a home or enterprise and a voice terminal that operates connected to an RNC and a circuit switching unit on an existing circuit switched network are expected to coexist during a transition period before all mobile networks evolve into IP networks, and hence there is a necessity to interconnect a voice call on an existing circuit switched networks and VoIP communication on the access point.

However, a gateway apparatus capable of such interconnection currently does not exist. It is difficult to realize the interconnection and issues remain before such a technology can be put to a widespread use.

It is an object of the present invention to provide a gateway apparatus, network system, and method capable of realizing voice communication between a terminal connected to a access point and an existing terminal connected to a circuit switching equipment by connecting the access point in a home or the like to the circuit switching equipment on a mobile circuit switched network by having the access point operate in the manner of a radio network controller (RNC).

It is another object of the present invention to provide a gateway apparatus, network system, and method capable of realizing interconnection of voice communication between a terminal connected to a femtocell access point, Home NodeB (HNB), or Home eNodeB (HeNB), a terminal connected to a second gateway apparatus via a radio network controller (RNC), and a terminal connected to the second gateway apparatus via in an IMS network.

According to the present invention, there is provided a gateway apparatus that connects an access point installed to a circuit switching equipment on a mobile circuit switched network to perform voice communication, wherein the gateway apparatus comprises a conversion section that receives at least one of a call control signal and a packet that has voice data stored therein in a predetermined protocol or payload format from the access point, converts at least one of a protocol of the call control signal and a protocol or payload format of the packet into the same protocol as a circuit switched protocol used when a radio network controller (RNC) connects to the circuit switch equipment, for output to the circuit switch equipment, receives at least one of a call processing signal that uses a protocol same as a protocol which is used when the circuit switching equipment outputs to the radio network controller and a voice signal that uses the same protocol, and converts at least one protocol of the call processing signal and the voice signal received, for output to the access point.

According to the present invention, there is provided a gateway method by a gateway that performs voice communication by connecting an access point installed to a circuit switching equipment on a mobile circuit switched network, wherein the method comprises:

receiving at least one of a call control signal of a predetermined protocol and a packet that has voice data stored therein in a predetermined protocol or payload format from the access point;

converting at least one of a protocol of the call control signal and a protocol or payload format of the packet into the same protocol as a circuit switched protocol used when a radio network controller (RNC) connects to the circuit switch equipment, for output to the circuit switching equipment on the mobile circuit switched network;

receiving at least one of a call processing signal that uses a protocol same as a protocol which is used when the circuit switching equipment outputs to the radio network controller and a voice signal that uses the same protocol from the circuit switching equipment on the mobile circuit switched network; and converting at least one protocol of the call processing signal and the voice signal received, for output to the access point.

According to the present invention, there is provided a program and a computer-readable storage medium storing the program that causing a computer constituting a gateway apparatus which performs voice communication by connecting an access point installed to a circuit switching equipment on a mobile circuit switched network to execute the processing comprising:

receiving at least one of a call control signal and a packet that has voice data stored therein in a predetermined protocol or payload format from the access point;

converting at least one of a protocol of the call control signal and a protocol or payload format of the packet into the same protocol as a circuit switched protocol used when a radio network controller (RNC) connects to the circuit switch equipment, for output to the circuit switch equipment;

receiving at least one of a call processing signal that uses a protocol same as a protocol which is used when the circuit switching equipment outputs to the radio network controller and a voice signal that uses the same protocol; and converting at least one protocol of the call processing signal and the voice signal received, for output to the access point.

According to the present invention, there is provided a gateway apparatus that connects a femtocell access point, Home NodeB, or Home eNodeB to a second gateway apparatus that interconnects a mobile circuit switched network and an IMS network, wherein the gateway apparatus comprises a conversion section that receives at least one of a call control signal and a packet that has voice data stored therein in a predetermined protocol or payload format from the femtocell access point, the Home NodeB, or the Home eNodeB, converts at least one of the call control signal, the protocol, and the payload format, when determining that at least one of the call control signal, the protocol, and the payload format needs to be converted; for output to the second gateway apparatus in the same protocol as a circuit switched protocol used when a radio network controller (RNC) connects to the second gateway apparatus, receives at least one of a call processing signal that uses a protocol same as a protocol which is used when the second gateway apparatus outputs to the radio network controller (RNC) and a voice signal stored using the same protocol from the second gateway apparatus, and converts at least one protocol of the call control signal and the voice signal received when determining that at least one of the protocols of the call control signal and the voice signal needs to be converted, for output to the access point, the Home NodeB, or the Home eNodeB.

According to the present invention, there is provided a gateway method by a gateway apparatus that connecting a femtocell access point, Home NodeB, or Home eNodeB to a second gateway apparatus that interconnects a mobile circuit switched network and an IMS IP Multimedia Subsystem network, wherein the method comprises:

receiving at least one of a call control signal and a packet that has voice data stored therein in a predetermined protocol or payload format from the femtocell access point, the Home NodeB, or the Home eNodeB;

converting at least one of the call control signal, the protocol, and the payload format when determining that at least one of the call control signal, the protocol, and the payload format needs to be converted, for output to the second gateway apparatus in the same protocol as a circuit switched protocol used when a radio network controller (RNC) connects to the second gateway apparatus;

receiving at least one of a call processing signal that uses a protocol same as a protocol which is used when the second gateway apparatus outputs to the radio network controller (RNC) and a voice signal stored using the same protocol from the second gateway apparatus; and converting at least one protocol of the call control signal and the voice signal received when determining that at least one of the protocols of the call control signal and the voice signal needs to be converted, for output to the access point, the Home NodeB, or the Home eNodeB.

According to the present invention, there is provided a program and a computer-readable storage medium storing the program which causes a computer constituting a gateway apparatus or server apparatus connecting a femtocell access point, Home NodeB, or Home eNodeB to a second gateway apparatus that interconnects a mobile circuit switched network and an IMS network to execute the processing comprising:

receiving at least one of a call control signal and a packet that has voice data stored therein in a predetermined protocol or payload format from the access point, the Home NodeB, or the Home eNodeB;

converting at least one of the call control signal, the protocol, and the payload format when determining that at least one of the call control signal, the protocol, and the payload format needs to be converted, for output to the second gateway apparatus in the same protocol as a circuit switched protocol used when a radio network controller (RNC) connects to the second gateway apparatus;

receiving at least one of a call processing signal that uses a protocol same as a protocol which is used when the second gateway apparatus outputs to the radio network controller and a voice signal stored using the same protocol from the second gateway apparatus; and converting at least one protocol of the call control signal and the voice signal received when determining that at least one of the protocols of the call control signal and the voice signal needs to be converted, for output to the access point, the Home NodeB, or the Home eNodeB.

According to the present invention, by connecting an access point installed in a home to a circuit switching equipment on a mobile circuit switched network via a gateway apparatus according to the present invention, interconnection between a terminal connected to the access point and a circuit switching equipment terminal connected to the circuit switching equipment is made possible, and voice communication therebetween can be achieved.

According to the present invention, it becomes possible to realize interconnection of voice communication between a terminal connected to a femtocell access point, Home NodeB (HNB), or Home eNodeB (HeNB), a terminal connected to a second gateway apparatus via a radio network controller (RNC), and a terminal connected to the second gateway apparatus via an IMS network.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

The following describes the configuration and operation of exemplary embodiments of the present invention. By connecting an access point installed in a home to a circuit switching equipment on a mobile circuit switched network, a gateway apparatus according to the present invention implements interconnection between a terminal connected to the access point and a circuit switched terminal connected to the circuit switching equipment, and performs voice communication. The gateway apparatus of the present invention receives a call control signal of a predetermined protocol and/or a packet that has voice data stored therein in a predetermined protocol or payload format from the access point, converts the call control signal protocol and/or the packet protocol or payload format into a predetermined circuit switched protocol, and outputs the signal and/or the packet to the circuit switching equipment on the mobile circuit switched network.

The gateway apparatus of the present invention receives at least one of a call processing signal of a predetermined circuit switched protocol and a voice signal of a predetermined circuit switched protocol from the circuit switching equipment, converts the protocol of the one of the call processing signal and the voice signal received, and outputs the signal to the access point on a mobile high-speed network. The following describes specific exemplary embodiments.

Exemplary Embodiment 1

Figure 1:
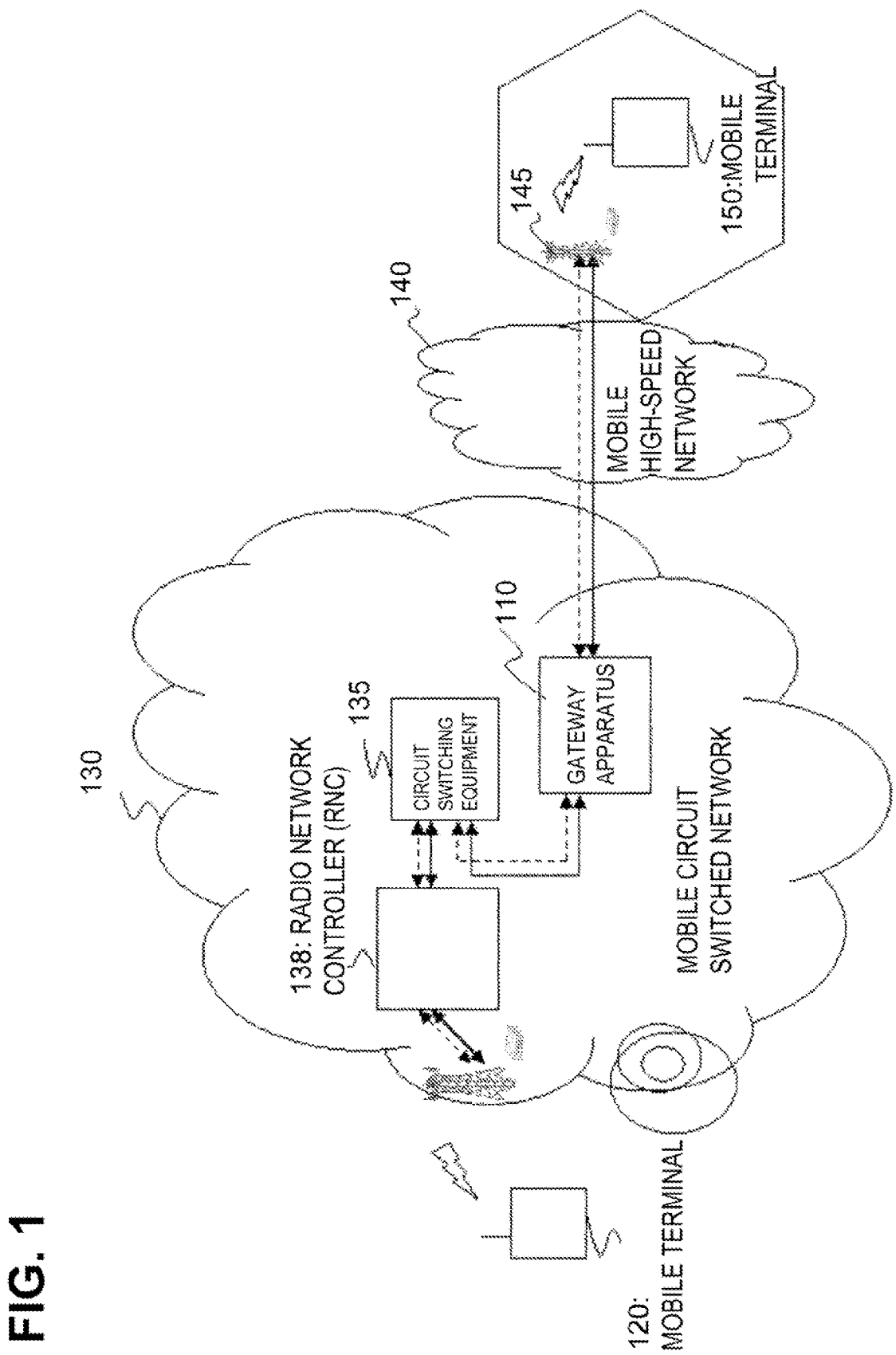
FIG. 1 is a diagram illustrating a network configuration and a topology of a first exemplary embodiment of the present invention.

FIG. 1 is a diagram illustrating the network configuration and topology of a gateway apparatus of a first exemplary embodiment of the present invention. In FIG. 1, a mobile terminal 120 is a voice telephone terminal connected to a mobile circuit switched network 130. As the mobile terminal 120, an existing voice telephone terminal may be used. The mobile terminal 120 is connected to the mobile circuit switched network 130 and exchanges a call control signal and a voice signal with a circuit switching equipment 135 via a radio network controller 138. The mobile terminal 120 exchanges a circuit switched call control signal with the circuit switching equipment 135 via the radio network controller 138, has for instance an AMR (Adaptive Multi-Rate) audio codec installed as an audio codec, and transmits/receives a bit stream obtained by performing compression-encoding of a voice signal at a bit rate of 12.2 kbps. As for details of the AMR audio codec, reference can be made to, for instance, the 3GPP (Third Generation Partnership Project) TS 26.090 standard.

The circuit switching equipment 135 exchanges a call processing signal used in the mobile circuit switched network 130 such as ISUP (Integrated Services Digital Network User Part) with the mobile terminal 120, and exchanges an AMR stream as voice data therewith.

Further, the circuit switching equipment 135 exchanges a call control signal with the gateway apparatus 110 using, for instance, the ISUP protocol, and exchanges an AMR audio stream therewith in a format in which the stream is stored in IuUP (Iu User Plane) circuit switched protocol. As for details of the IuUP protocol, reference may be to, for instance, the 3GPP TS 25.415 standard.

The gateway apparatus 110 is connected to the circuit switching equipment 135 on the mobile circuit switched network 130 and is connected to a femtocell access point 145 which is installed, for instance, in a home via a mobile high-speed network 140. By setting the femtocell access point 145 to operate in a manner the same as the radio network controller (RNC) 138, i.e., by converting the protocol of the femtocell access point 145 into the same protocol as that of the RNC, the gateway apparatus 110 connects the femtocell access point 145 to the circuit switching equipment 135. As a result, circuit-switched voice communication by the mobile terminal 120 and VoIP communication by a mobile terminal 150 are interconnected to each other. In other words, the gateway apparatus 110 achieves the interconnection by converting at least one of the protocol of a call control signal and the protocol of a voice signal.

Figure 2:
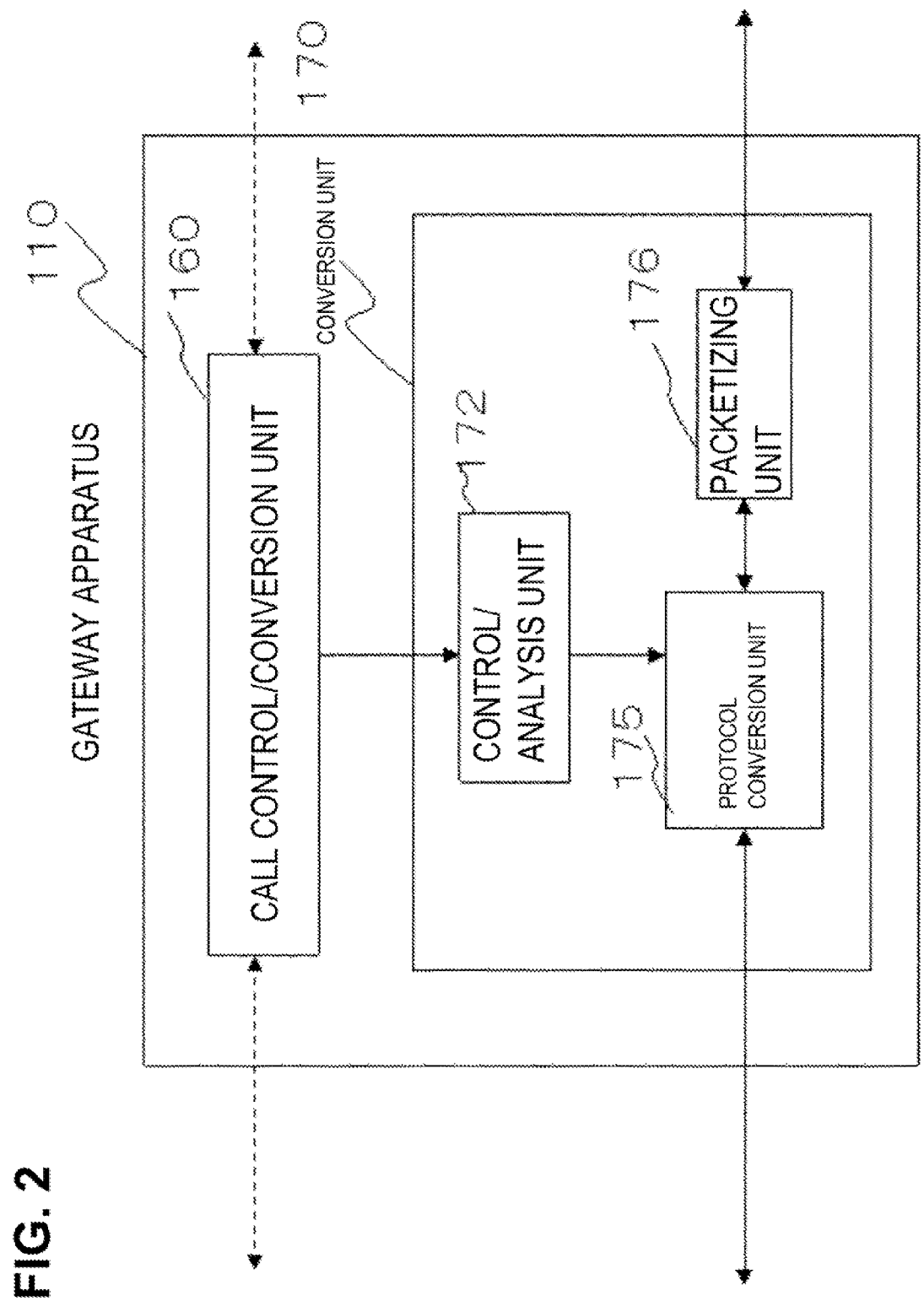
FIG. 2 is a diagram illustrating a configuration of a gateway apparatus of the first exemplary embodiment of the present invention.

FIG. 2 is a diagram illustrating the configuration of the gateway apparatus 110 shown in FIG. 1. With reference to FIG. 2, the gateway apparatus 110 comprises a call control/conversion unit 160 and a conversion unit 170, and the conversion unit 170 comprises a control/analysis unit 172, a protocol conversion unit 175, and a packetizing unit 176.

The call control/conversion unit 160 converts a circuit-switched call control signal (for instance ISUP) received from the circuit switching equipment 135 on the mobile circuit switched network 130 into a call control signal of the femtocell access point 145 (for instance SIP (Session Initiation Protocol), SDP (Session Description Protocol), and GTP-C), and outputs the converted signal to the femtocell access point 145. As for details of SIP and SDP, reference can be made to, for instance, IETF (The Internet Engineering Task Force) RFC (Request For Comments) 3261 and RFC 2327, respectively. GTP stands for the GPRS (Generalized Packet Radio Service) Tunneling Protocol, IP-based protocols used in the GPRS core network; GTP-C is a protocol for opening/closing a session between SGSN (Serving GPRS Support Node) and GGSN (Gateway GPRS Support Node), GTP-U is used for transmission of subscriber's data, and GTP' (GTP Prime) is used for transmission of billing data.

In the opposite direction, the call control/conversion unit 160 receives a call control signal (for instance, SIP, SDP, and GTP-C) from the femtocell access point 145 on the mobile high-speed network 140, converts the signal into a protocol of a circuit-switched call control signal (for instance, ISUP), and outputs the converted signal to the circuit switching equipment 135 on the mobile circuit switched network 130.

The call control/conversion unit 160 outputs necessary information from information included in the call control signal received from the mobile circuit switched network 130 and information included in the SIP or SDP signal received from the mobile high-speed network 140 to the control/analysis unit 172 arranged in the conversion unit 170 on a per channel basis.

The control/analysis unit 172 receives the aforementioned information from the call control/conversion unit 160 on a per channel basis, compares the information with each other, and determines whether or not protocol conversion is necessary.

When the conversion is needed, the control/analysis unit 172 outputs conversion information defining what kind of conversion is to be performed to the protocol conversion unit 175 on a per channel basis.

The protocol conversion unit 175 receives an IuUP circuit switching protocol frame from the circuit switching equipment 135 on the mobile circuit switched network 130 and constructs an RTP (Realtime Transport Protocol) payload format specified in IETF RFC 3267

More specifically, the protocol conversion unit 175 first reads a compression-encoded audio bit stream stored in the IuUP protocol frame. Here, the compression-encoded audio bit stream is assumed to be a bit stream compression-encoded in accordance with AMR.

Further, the protocol conversion unit 175 receives the conversion information from the control/analysis unit 172 on a per for channel basis, and when the protocol conversion is needed, the protocol conversion unit 175 constructs an RTP payload format header according to IETF RFC 3267, for instance, on a per for channel basis, according to the conversion information and stores the AMR compression-encoded bit stream in the payload portion.

Here, since frame type information included in the AMR compression-encoded bit stream indicates a bit rate, the protocol conversion unit 175 converts it into codec mode request (CMR) information according to RFC 3267. Further, the protocol conversion unit 175 sets octet alignment and other parameters required by setting according to RFC 3267 to predetermined setting values.

The packetizing unit 176 receives the RTP payload format information from the protocol conversion unit 175, stores it in the payload portion of the RTP packet, and outputs an RTP/UDP (User Datagram Protocol)/IP packet.

In connection in the opposite direction (from the femtocell access point 145 on the mobile high-speed network 140 to the circuit switching equipment 135 on the mobile circuit switched network 130), the conversion is performed following the path reverse to the description above and the interconnection between the femtocell access point 145 and the circuit switching equipment 135 is achieved. In other words, the packetizing unit 176 receives an RTP/UDP/IP packet having voice data stored therein with a predetermined protocol or payload format from the femtocell access point 145, and de-packetizes the packet, and the protocol conversion unit 175 converts the protocol or payload format of the packet into a circuit switched protocol and outputs the resulting signal to the circuit switching equipment 135 on the mobile circuit switched network 130.

The mobile terminal 150 denotes a VoIP voice terminal connected to the femtocell access point 145 on the IP-based mobile high-speed network 140 (for instance, LTE, EPC, UMA, HSDPA, HSPA, mobile WiMax or the like).

The mobile terminal 150, on which for instance, an AMR audio codec is mounted, performs compression encoding of a voice signal, for instance, at a bit rate of 12.2 kbps to generate a bit stream.

The mobile terminal 150 further stores the bit stream in an RTP packet, generates the RTP packet, and then connects to the femtocell access point 145 on the mobile high-speed network 140 for transmission/reception of the RTP packet over UDP/IP.

When the AMR bit stream is RTP-packetized, an RTP payload format is necessary. Regarding the RTP payload format, reference can be made to, for instance, the IETF RFC 3267 standard.

Further, regarding the details of voice communication functions of such a VoIP terminal, reference can be made to, for instance, the 3GPP TS 26.114 standard.

In the above exemplary embodiment, other known codecs such as AMR-WB and G.711; instead of the AMR mentioned above, can be used as the audio codec used for generating a compression-encoded audio bit stream.

Further, other known protocols such as GTP-U (GPRS Tunneling Protocol. User) may be used as the protocol storing the compression-encoded audio stream transmitted/received by the femtocell access point 145.

A security conversion unit (not shown) that performs security processing on the packetized IP packet using, for instance, IPsec may be added next to the conversion unit 170 on the side of the mobile high-speed network 140.

The control/analysis unit 172 is provided in the conversion unit 170, however, it may be provided in the call control/conversion unit 160 as well.

The call control/conversion unit 160 and the conversion unit 170 may be realized separately in difference apparatuses. In such a configuration, for instance, the ITU-T H.248 MEGACO (Media Gateway Control) protocol can be used for the exchange of a control signal between the call control/conversion unit 160 and the conversion unit 170.

As the access point, HNB (Home NodeB), HeNB (Home eNodeB), Wimax or the like may be used, in addition to the femtocell mentioned in the above exemplary embodiment.

In the above exemplary embodiment, the processing and functions of the call control/conversion unit 160 and the conversion unit 170 of the gateway apparatus 110 may be implemented by a computer program executed on a computer constituting the gateway apparatus 110.

Exemplary Embodiment 2

Figure 3:
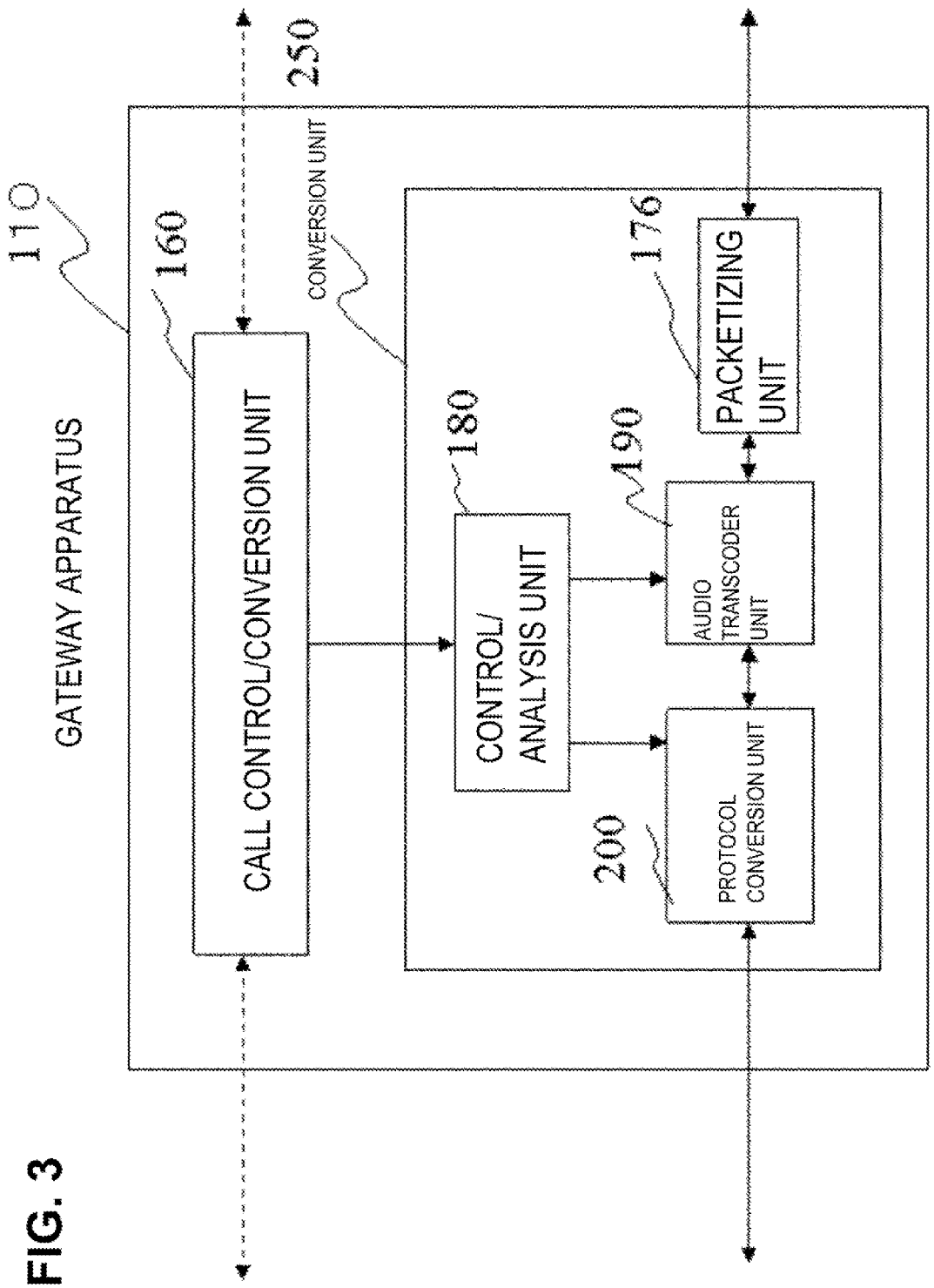
FIG. 3 is a diagram illustrating a configuration of a gateway apparatus of a second exemplary embodiment of the present invention.

The following describes a second exemplary embodiment of the present invention. FIG. 3 is a diagram illustrating the configuration of the second exemplary embodiment of the present invention. In FIG. 3, the same reference numbers are given to elements same as those in FIG. 2. Explanations of the elements same as those in the first exemplary embodiment in FIG. 2 will be omitted and the difference from the first exemplary embodiments will be described below.

With reference to FIG. 3, since the mobile terminals 120 and 150 have different audio codecs mounted therein, the gateway apparatus 110 converts the audio encoding scheme, in addition to the protocol.

A control/analysis unit 180 analyzes information received from the call control/conversion unit 160, and when different audio codecs are used between the terminals, the control/analysis unit 180 issues an instruction to the protocol conversion unit 200 and an audio transcoder unit 190 to convert not only the protocol, but also the audio codec on a per channel basis.

The audio transcoder unit 190 performs audio codec conversion based on the conversion instruction from the control/analysis unit 180.

In the present exemplary embodiment, for instance, it is assumed that the mobile terminal 120 on the mobile circuit switched network 130 side has an AMR codec installed and the mobile terminal 150 on the mobile high-speed network 140 side has a G.711 codec installed. In this case, the audio transcoder unit 190 performs audio codec conversion between AMR and G.711.

The protocol conversion unit 200 performs protocol conversion based on the conversion instruction from the control/analysis unit 180. For instance, a protocol is converted into the IuUP circuit switched protocol for the circuit switching equipment 135 on the mobile circuit switched network 130, and a protocol is converted into the RTP for the femtocell access point 145 on the mobile high-speed network 140. Here, in the case of G.711, the RIP payload format is unnecessary, unlike the case of AMR described in the first exemplary embodiment, and a payload type number, specified by the standard in advance, identifying that the audio codec used is G.711 should be simply written in the RTP header.

Further, in the present exemplary embodiment, other known codecs, in addition to AMR and G.711 mentioned above, can be used as the audio codec used for generating a compression-encoded audio bit stream.

Further, other known protocols such as GTP-U may be used as the protocol storing the compression-encoded audio stream transmitted/received by the femtocell access point 145. Moreover, other known protocols such as GTP-U may be used as the protocol storing the compression-encoded audio stream transmitted/received by the femtocell access point 145.

A security conversion unit that performs security processing on the packetized IP packet using, for instance, IPsec (Security Architecture for Internet Protocol) in which IP packets are transmitted/received after being encrypted may be added next to the conversion unit 170 on the side of the mobile high-speed network 140.

The control/analysis unit 180 is disposed in a conversion unit 250, however, it may be provided in the call control/conversion unit 160 as well.

In the present exemplary embodiment, the call control/conversion unit 160 and the conversion unit 250 may be disposed separately in difference apparatuses. In such a configuration, for instance, the ITU-T H.248 MEGACO (Media Gateway Control) protocol can be used for the exchange of control signals between the call control/conversion unit 160 and the conversion unit 250.

As the access point, HNB (Home NodeB), HeNB (Home eNodeB), Wimax, or the like may be used, in addition to the femtocell mentioned in the above exemplary embodiment. Further, in the second exemplary embodiment above, the processing and functions of the call control/conversion unit 160 and the conversion unit 250 of the gateway apparatus 110 may be implemented on a computer program executed by a computer constituting the gateway apparatus 110.

According to the present invention, by connecting an access point installed in a home to a circuit switching equipment on a mobile circuit switched network through a gateway apparatus according to the present invention, interconnection between a terminal connected to the access point and a circuit switching equipment terminal connected to the circuit switching equipment and voice communication therebetween can be achieved. In other words, interconnection between a terminal connected to a circuit switching equipment on a mobile circuit switched network and a VoIP terminal connected to an access point on a mobile high-speed network is made possible, and the interconnection of voice communication therebetween can be realized without remodeling the terminals.

According to the present invention, even in a case where the terminals use different audio codecs, by having the gateway apparatus perform audio codec conversion, the interconnection of voice communication between the terminals can be realized without remodeling the terminals.

Further, according to the present invention, by adding security processing to packetizing processing within the gateway apparatus on the mobile high-speed network side, the security function of packets exchanged between the access point and the gateway can be strengthened, and secure and reliable communication can be achieved.

Another Exemplary Embodiment

The following describes the configuration and operation of another exemplary embodiment of the present invention. In the present invention, a gateway apparatus connects an access point, HNB, or HeNB installed in a home to a gateway apparatus (a second gateway apparatus) interconnecting a mobile circuit switched network and an IMS network by having the access point operate in the manner of an RNC, and realizes the interconnection of voice communication between a terminal connected to the access point, HNB, or HeNB, a terminal connected to the second gateway apparatus via an RNC, and a terminal connected to the second gateway apparatus via the IMS network.

In the present invention, the gateway apparatus receives a call control signal of a predetermined protocol and/or a packet that has voice data stored therein in a predetermined protocol or payload format from a femtocell access point, HNB, or HeNB over a bearer (for instance, an IP bearer) in a mobile high-speed network, converts at least one of the protocol of the call control signal and the protocol or payload format of the packet, when necessary, into a mobile circuit switched protocol and outputs the converted protocol to the second gateway apparatus.

In the present invention, the gateway apparatus receives at least one of a call processing signal of a circuit switched protocol and a voice signal of a circuit switched protocol (for instance, IuUP) from the second gateway apparatus, converts at least one of them when necessary, and outputs the converted signal to a femtocell access point, HNB, or HeNB connected to a mobile high-speed network over a bearer (for instance, an IP bearer) in the mobile high-speed network.

There are conceived two types of the call control signal between the gateway apparatus according to the present invention and the femtocell, HNB, or HeNB, as follows:
(A) A circuit switched call control Signal is used as it is and forwarded by a bearer (for instance an IP bearer) in the mobile high-speed network.
(B) A SIP (Session Initiation Protocol) signal used by a VoIP is used and forwarded by a bearer in the mobile high-speed network.
In the explanation below, the former case (A) will be described, however, the latter case (B) can be realized with the same configuration.

There are conceived three types of the voice signal between the gateway apparatus according to the present invention and the femtocell, HNB, or HeNB, as follows:

(C) IuUP (Iu U-Plane), the circuit switched protocol, is used as it is and forwarded by a bearer (for instance an IP bearer) in the mobile high-speed network.
(D) RTP (Real-time Transfer Protocol) used by a VoIP is used and forwarded by a bearer in the mobile high-speed network.
(E) A configuration combining the two above, i.e., IuUP is used as it is and forwarded by a bearer in the mobile high-speed network using the RTP.
In the explanation below, the case (E) will be described. Note that the cases (C) and (D) can be realized with the same configuration. Specific embodiments based thereon will be described below. Further, explanations of combinations other than the ones mentioned above will be omitted, however, these can be realized as a matter of course by the present invention.

Exemplary Embodiment 3

Figure 4:
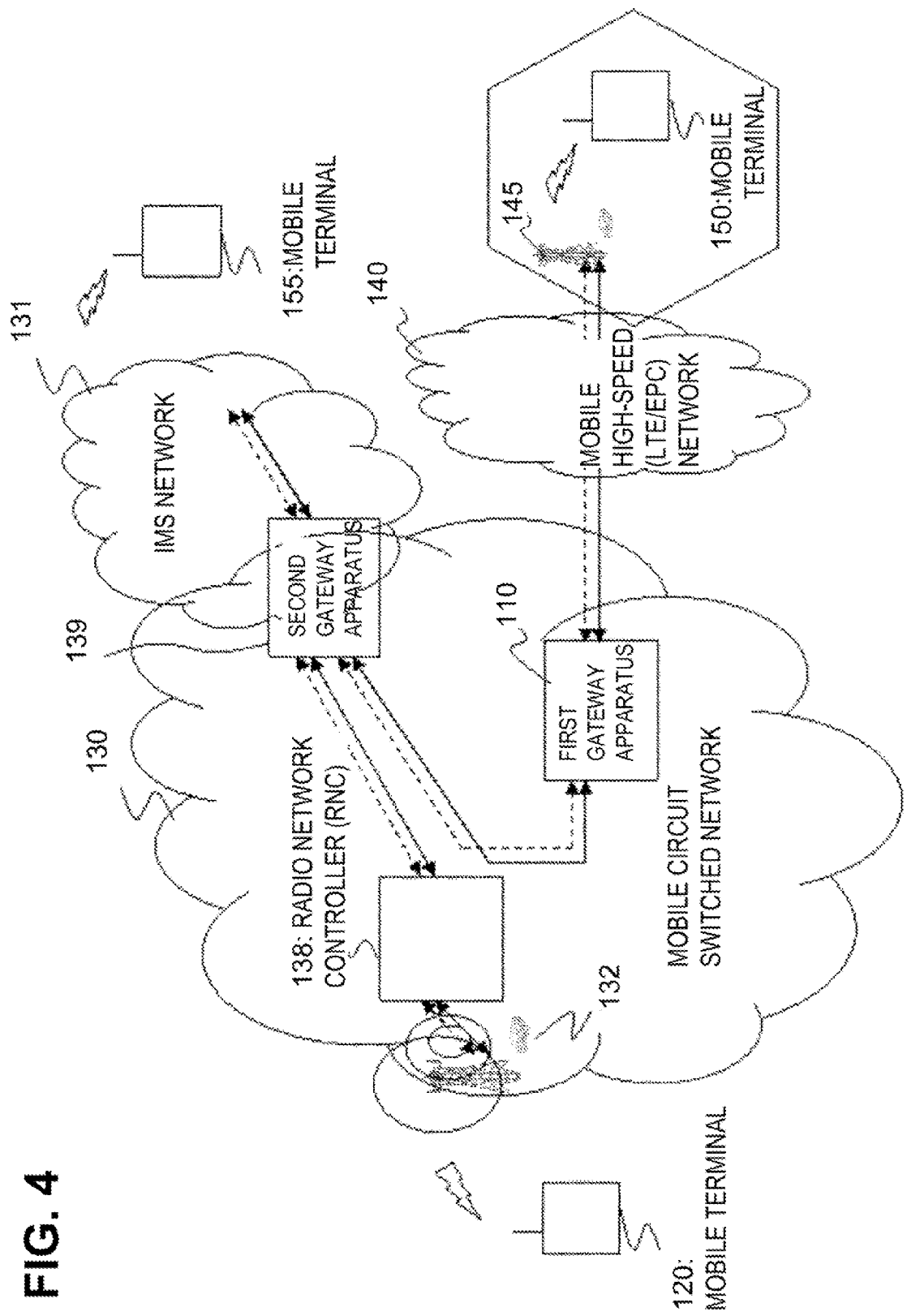
FIG. 4 is a diagram illustrating a network configuration and topology of a third exemplary embodiment of the present invention.

FIG. 4 is a diagram illustrating the network configuration and topology of a gateway apparatus of a third exemplary embodiment of the present invention. In FIG. 4, the mobile terminal 120 is a voice telephone terminal connected to the mobile circuit switched network 130.

An existing voice telephone terminal, though not limited thereto, may be used as the mobile terminal 120. The mobile terminal 120 is connected to the mobile circuit switched network 130 and exchanges a call control signal and a voice signal with a second gateway apparatus 139 via a radio base station 132 and a radio network controller 138. The mobile terminal 120 has, for instance, the AMR (Adaptive Multi-Rate) audio codec installed as an audio codec, and performs compression-encoding of a voice signal at a bit rate of 12.2 kbps for transmission/reception of a bit stream obtained by. As for details of the AMR audio codec, reference can be made to the 3GPP (Third Generation Partnership Project) TS 26.090 standard.

The second gateway apparatus 139 is also known as an "expanded MSC (Mobile Switching Center) server (eMSC server)." The second gateway apparatus 139 exchanges a call processing signal used in the mobile circuit switched network 130 such as ISUP (Integrated Services Digital Network User Part)—with the mobile terminal 120, and exchanges an AMR stream as voice data therewith.

The second gateway apparatus 139 converts an ISUP call processing signal into a SIP signal in order to interconnect the mobile circuit switched network 130 and an IMS network 131, and outputs the converted signal to the IMS network.

In the opposite direction, when receiving a SIP signal from the IMS network 131, the second gateway apparatus 139 converts it into an ISUP signal and outputs the converted signal to the radio network controller (RNC) 138 and the first gateway apparatus 110.

The first gateway apparatus 110 converts a protocol outputted by a femtocell access point, HNB, or HeNB 145 connected to the mobile high-speed network 140 into the same protocol as the one outputted by the RNC 138, if necessary, so that the access point, HNB, or HeNB 145 operates in the same manner as the radio network controller (RNC) 138, from the perspective of the second gateway apparatus 139, and connects the access point, HNB, or HeNB 145 to the second gateway apparatus 139.

As a result, circuit switched voice communication by the mobile terminal 120, voice communication by the mobile terminal 150, and a mobile terminal 155 connected via the IMS network 131 can be interconnected.

In other words, the first gateway apparatus 110 exchanges a circuit switched protocol as a call control signal with the femtocell access point, HNB, or HeNB 145 over an IP bearer, and the first gateway apparatus 110 exchanges a call control signal with the second gateway apparatus 139 using the ISUP protocol.

Next, with the femtocell access point, HNB, or HeNB 145, the first gateway apparatus 110 exchanges a packet over a bearer (for instance, an IP bearer) in the mobile high-speed network 140 by storing an AMR audio stream in the IuUP (Iu User Plane) circuit switched protocol as a voice signal and putting it on an RTP packet. As for details of the IuUP protocol, reference can be made to the 3GPP TS 25.415 and TS 26.102 standards.

Between the first gateway apparatus 110 and the second gateway apparatus 139, the first gateway apparatus 110 next extracts the IuUP protocol and the AMR stream stored in the protocol frame therein and exchanges these with the second gateway apparatus 139 over a circuit switched bearer (for instance, ATM (Asynchronous Transfer Mode) or TDM (Time Division Multiplexing)).

Figure 5:
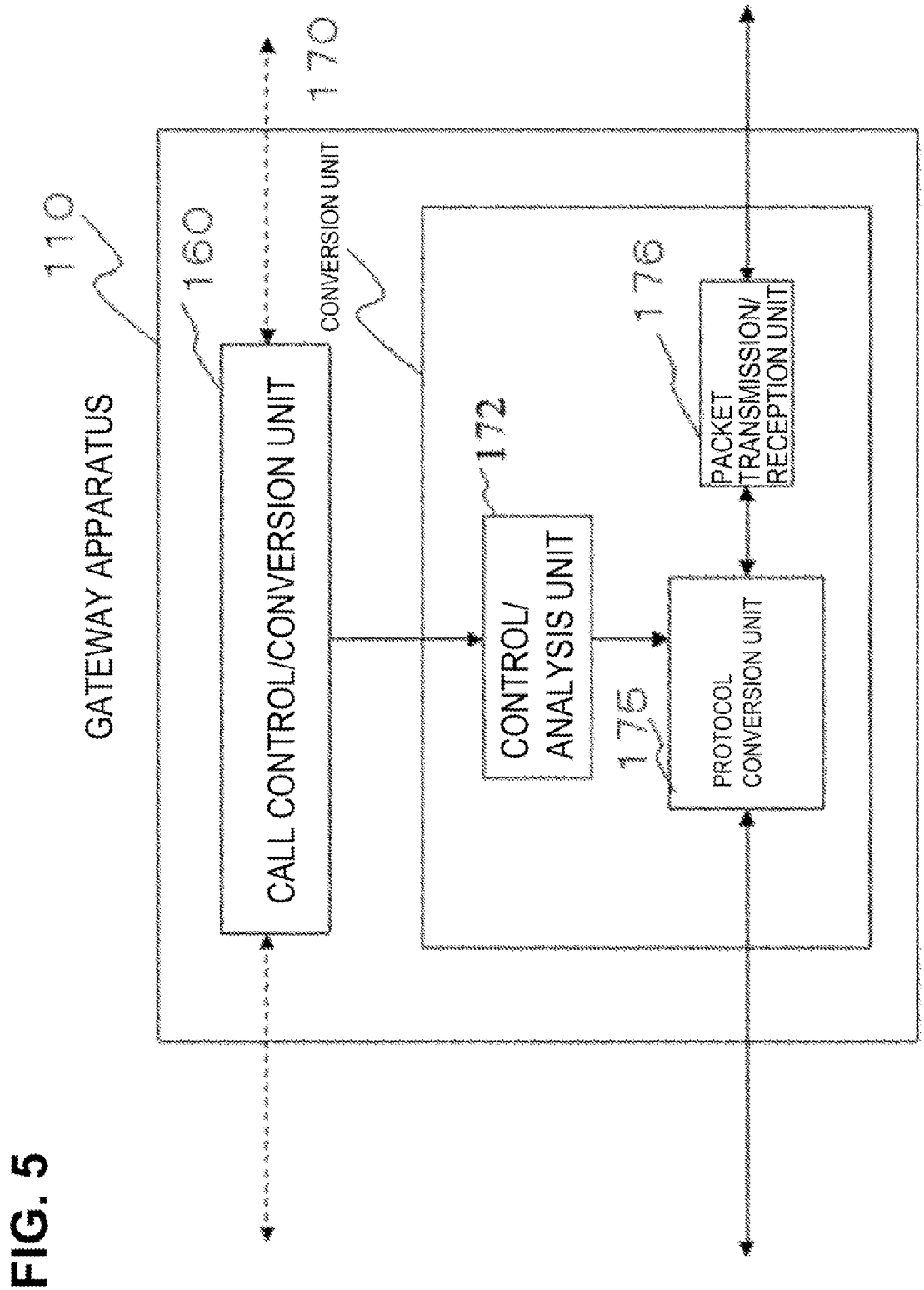
FIG. 5 is a diagram illustrating a configuration of a first gateway apparatus of the third exemplary embodiment of the present invention.

FIG. 5 is a diagram showing the configuration of the gateway apparatus 110 shown in FIG. 4. Referring to FIG. 5, the first gateway apparatus 110 comprises a call control/conversion unit 160 and a conversion unit 170. The conversion unit 170 comprises a control/analysis unit 172, a protocol conversion unit 175, and a packet transmission/reception unit 176.

The call control/conversion unit 160 places a circuit switched call control signal (for instance, ISUP) received from the second gateway apparatus 139 over a circuit switched bearer (for instance, ATM or TDM) on a bearer (for instance, an IP bearer) in the mobile high-speed network 140, and then outputs the signal to the femtocell access point, HNB, or HeNB 145. When the bearer switching process is performed, encryption can be applied at the IP level using IPsec, if necessary.

In the opposite direction, the call control/conversion unit 160 receives a circuit switched call control signal (for instance ISUP) from the femtocell access point, HNB, or HeNB 145 on the mobile high-speed network 140 over an IP bearer, decodes IPsec encryption, if necessary, performs replacing the call control signal on a circuit switched bearer (for instance, ATM (Asynchronous Transfer Mode) or TDM (Time Division Multiplexing)), and outputs the signal to the second gateway apparatus 139.

The call control/conversion unit 160 outputs necessary information from information included in the call control signal received from the second gateway apparatus 139 and information included in the call control signal received from the femtocell access point, HNB, or HeNB 145 to the control/analysis unit 172 in the conversion unit 170 on a per channel basis.

The control/analysis unit 172 receives the aforementioned information from the call control/conversion unit 160 on a per channel basis, compares the information with each other, and determines whether or not the protocol of the voice signal needs to be converted.

When no protocol conversion is needed, the control/analysis unit 172 outputs an instruction indicating that no conversion is necessary to the protocol conversion unit 175 on a per channel basis.

The protocol conversion unit 175 receives an IuUP circuit switching protocol frame, which is a circuit switched protocol, from the second gateway apparatus 139 and places the IuUP frame on an RTP/UDP as it is since no conversion is needed.

Conversely, when the conversion is needed, the protocol conversion unit 175 receives a conversion instruction from the call control/conversion unit 172 on a per channel basis, and converts the IuUP circuit frame, which is a circuit switched protocol, into the RTP (Realtime Transport Protocol) payload format defined in IETF RFC 3267. More specifically, the protocol conversion unit 175 first reads a compression-encoded audio bit stream stored in RAB (Radio Access Bearer) SubFlow of the payload of the IuUP protocol frame. Here, the compression-encoded audio bit stream is assumed to be a bit stream compression-encoded in accordance with AMR.

Further, the protocol conversion unit 175 constructs an RTP payload format header according to IETF RFC 3267, for instance, on a per channel basis according to the conversion information and stores the AMR compression-encoded bit stream in the RTP payload portion.

Here, since frame type information included in the AMR compression-encoded bit stream indicates a bit rate, the protocol conversion unit 175 sets the frame type information to the codec mode request (CMR) information of RFC 3267. Further, the protocol conversion unit 175 sets octet alignment and other parameters required by RFC 3267 to predetermined values.

When no conversion is necessary, the packet transmission/reception unit 176 receives the RTP packet from the protocol conversion unit 175, and when the conversion is necessary, the packet transmission/reception unit 176 receives the RTP payload format information and the AMR compression-encoded audio bit stream, stores them in the payload portion of the RTP packet, and outputs the RTP/UDP (User Datagram Protocol) packet to the femtocell access point, HNB, or HeNB 145 over the IP bearer, which is a bearer in the mobile high-speed network.

In connection in the opposite direction (from the femtocell access point, HNB, or HeNB 145 to the second gateway apparatus 139), the conversion is performed following the path reverse to the description above, and the first gateway apparatus 110 interconnects the femtocell access point, HNB, or HeNB 145 and the second gateway apparatus 139.

In other words, from the femtocell access point, HNB, or HeNB 145, the packet transmission/reception unit 176 receives an RTP packet storing an AMR compression-encoded bit stream or an RTP packet storing an AMR compressed bit stream by means of the RTP payload format over the IP bearer in the mobile high-speed network, reads the RTP packet header, or the RTP payload format header, extracts the IuUP protocol frame or the AMR compression-encoded audio bit stream stored in the RTP payload, and outputs it to the protocol conversion unit 175.

When having received an instruction from the control/analysis unit 172 indicating no conversion is needed, the protocol conversion unit 175 reads an RTP header, extracts the IuUP protocol information stored in an RTP payload, and outputs this information to the second gateway apparatus 139 over the circuit switched bearer (for instance ATM or TDM).

When having received an instruction from the control/analysis unit 172 indicating the conversion is needed, the protocol conversion unit 175 reads CMR or the like of an RTP payload format header received from the femtocell access point, HNB, or HeNB 145, constructs an IuUP circuit switching protocol frame based thereon, stores the AMR compression-encoded bit stream read from an RTP payload in RAB SubFlow of the IuUP payload, and outputs it to the second gateway apparatus 139 on the mobile circuit switched network 130 over the circuit switched bearer.

Referring back to FIG. 4, the mobile terminal 155 denotes a voice terminal connected to the IMS network 131.

The mobile terminal 155 has, for instance, the AMR audio codec installed, and generates a bit stream by performing compression encoding of a voice signal at, for instance, a bit rate of 12.2 kbps.

The mobile terminal 155 further stores the bit stream in an RTP packet, generates an RTP packet and connects to the second gateway apparatus 139 on the IMS network, and performs transmission/reception of the RTP packet over UDP/IP.

Here, when the AMR bit stream is RTP-packetized, an RTP payload format is necessary. Regarding the RTP payload format, reference can be made to, for instance, the IETF RFC 3267 standard. Further, regarding the details of voice communication functions of such a terminal, reference can be made to, for instance, the 3GPP TS 26.114 standard.

In the third exemplary embodiment above, other known codecs such as AMR-WB and G.711, in addition to AMR mentioned above, can be used as an audio codec used for generating a compression-encoded audio bit stream.

Further, other known protocols such as GTP-C (GPRS Tunneling Protocol Control Plane) and GTP-U (GPRS Tunneling Protocol User Plane) may be used as the protocol storing the call control signal and the compression-encoded audio stream transmitted/received by the femtocell access point, HNB, or HeNB 145.

A security conversion unit performing security processing on the packetized IP packet using, for instance, IPsec may be added next to the conversion unit 170 on the side of the mobile high-speed network 140.

Although the control/analysis unit 172 is provided in the conversion unit 170, the control/analysis unit 172 may be provided in the call control/conversion unit 160 as well.

The call control/conversion unit 160 and the conversion unit 170 may be realized separately in difference apparatuses. In such a configuration, for instance, the ITU-T H.248 MEGACO (Media Gateway Control) protocol can be used for the exchange of control signals between the call control/conversion unit 160 and the conversion unit 170.

Further, as the femtocell access point, HNB, or HeNB 145, HNB (Home NodeB), HeNB (Home eNodeB) or the like may be used, in addition to the femtocell access point.

Further, in the third exemplary embodiment above, the processing and functions of the call control/conversion unit 160 and the conversion unit 170 of the first gateway apparatus 110 may be implemented by a computer program executed on a computer constituting the first gateway apparatus 110. Further, the first gateway apparatus 110 may be mounted on a server apparatus.

Exemplary Embodiment 4

Figure 6:
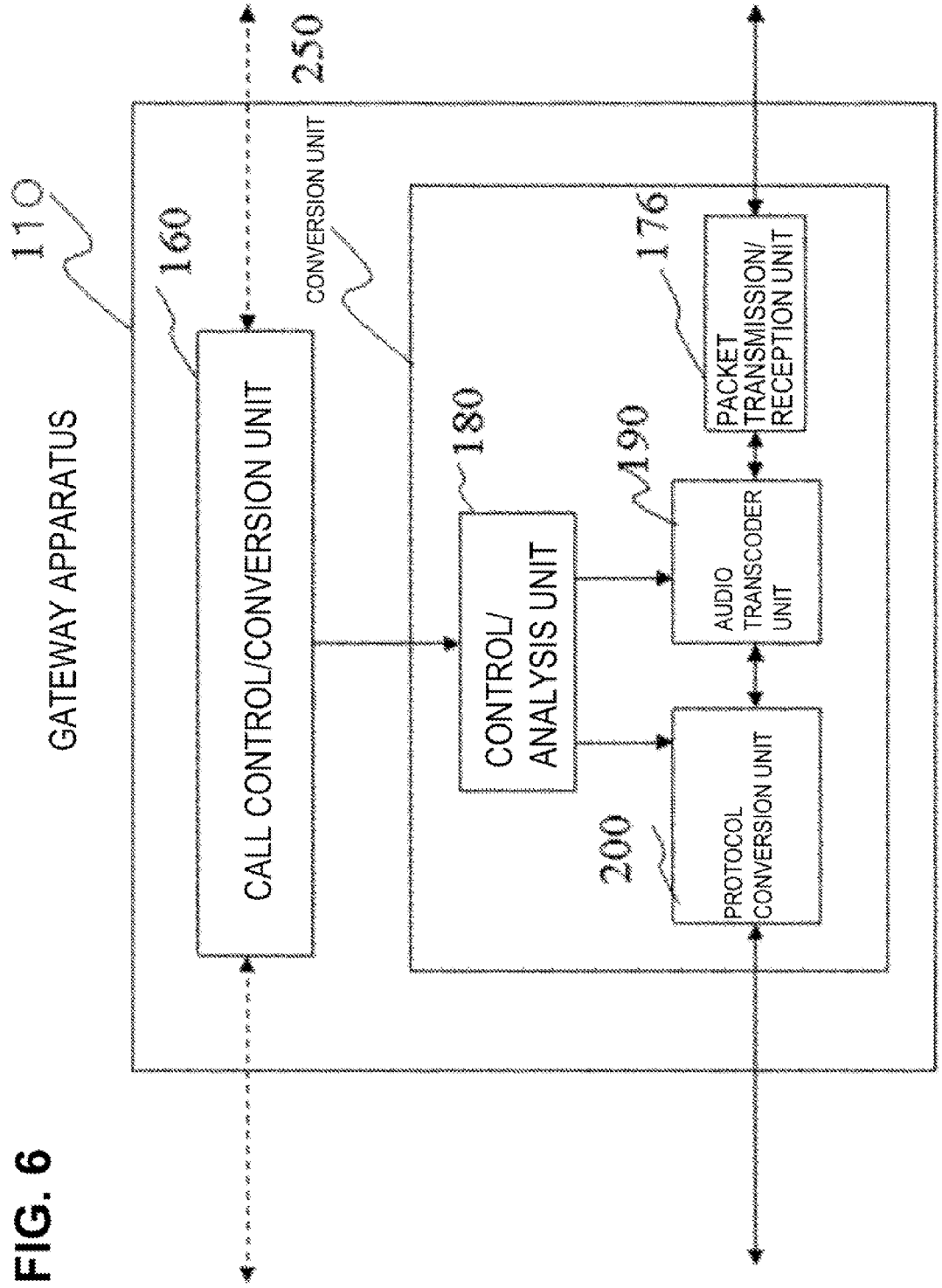
FIG. 6 is a diagram showing a configuration of a first gateway apparatus of a fourth exemplary embodiment of the present invention.

The following describes a fourth exemplary embodiment of the present invention. FIG. 6 is a diagram illustrating the configuration of the first gateway apparatus 110 of the fourth exemplary embodiment of the present invention. In FIG. 6, the same reference numbers are given to elements same as those in FIG. 5. Explanations of the elements same as those in the third exemplary embodiment in FIG. 5 will be omitted and the difference from the third exemplary embodiment will be described below.

With reference to FIG. 6, in the present exemplary embodiment, the conversion unit 170 (refer to FIG. 5) in the third exemplary embodiment is replaced with a conversion unit 250. The conversion unit 250 comprises a control/analysis unit 180, a protocol conversion unit 200, an audio transcoder unit 190, and the packet transmission/reception unit 176.

In FIG. 6, since the mobile terminals 120 and 150 have different audio codecs installed therein, the first gateway apparatus 110 converts an audio encoding scheme.

The control/analysis unit 180 analyzes information received from the call control/conversion unit 160, and when audio compression-encoding schemes (audio codecs) are different between the terminals, the control/analysis unit 180 issues an instruction to the protocol conversion unit 200 and the audio transcoder unit 190 to perform conversion of the audio compression-encoding scheme (audio codec) on a per channel basis.

The audio transcoder unit 190 performs conversion of the audio compression-encoding scheme (audio codec) based on the conversion instruction from the control/analysis unit 180.

In the present exemplary embodiment, for instance, it is assumed that the mobile terminal 120 on the mobile circuit switched network 130 side has AMR installed and the mobile terminal 150 connected to femtocell access point, HNB, or HeNB 145 has G.711 installed. In this case, the audio transcoder unit 190 performs conversion of the audio compression-encoding scheme (audio codec) between AMR and G.711.

The protocol conversion unit 200 performs protocol conversion based on the conversion instruction issued from the control/analysis unit 180, when necessary. For instance, a protocol is converted into the IuUP circuit switched protocol for the second gateway apparatus 139, and a protocol is converted into the RTP for the femtocell access point, HNB, or HeNB 145. Alternatively, IuUP is stored in an RTP payload. Or, the IuUP protocol is stored in an RTP payload after an RTP payload format is added. Here, in the case of G.711, the RTP payload format is unnecessary, unlike the case of AMR described in the third exemplary embodiment, and a payload type number, defined by the standard in advance, identifying that the audio codec used is G.711 should be simply written in the RTP header.

In the present exemplary embodiment, other known codecs, in addition to AMR and G.711 mentioned above, can be used as the audio codec used for generating a compression-encoded audio bit stream.

Other known protocols such as GTP-U may be used as the protocol storing the compression-encoded audio stream transmitted/received by the femtocell access point, HNB, or HeNB 145.

A security conversion unit performing security processing on a packetized IP packet using, for instance, IPsec (Security Architecture for Internet Protocol) in which the IP packets is transmitted/received after being encrypted may be added next to an output of the conversion unit 250 to the mobile high-speed network 140.

In the present exemplary embodiment, the control/analysis unit 180 is disposed in the conversion unit 250, however, it may be provided in the call control/conversion unit 160 as well.

In the present exemplary embodiment, the call control/conversion unit 160 and the conversion unit 250 may be disposed separately in difference apparatuses. In such a configuration, for instance, the ITU-T H.248 MEGACO protocol can be used for the exchange of control signals between the call control/conversion unit 160 and the conversion unit 250.

The femtocell access point may be connected to an HNB (Home NodeB) and HeNB (Home eNodeB).

In the fourth exemplary embodiment above, the processing and functions of the call control/conversion unit 160 and the conversion unit 250 of the first gateway apparatus 110 may be implemented by a computer program executed on a computer constituting the first gateway apparatus 110. The first gateway apparatus 110 may be implemented on a server apparatus.

Figure 7:
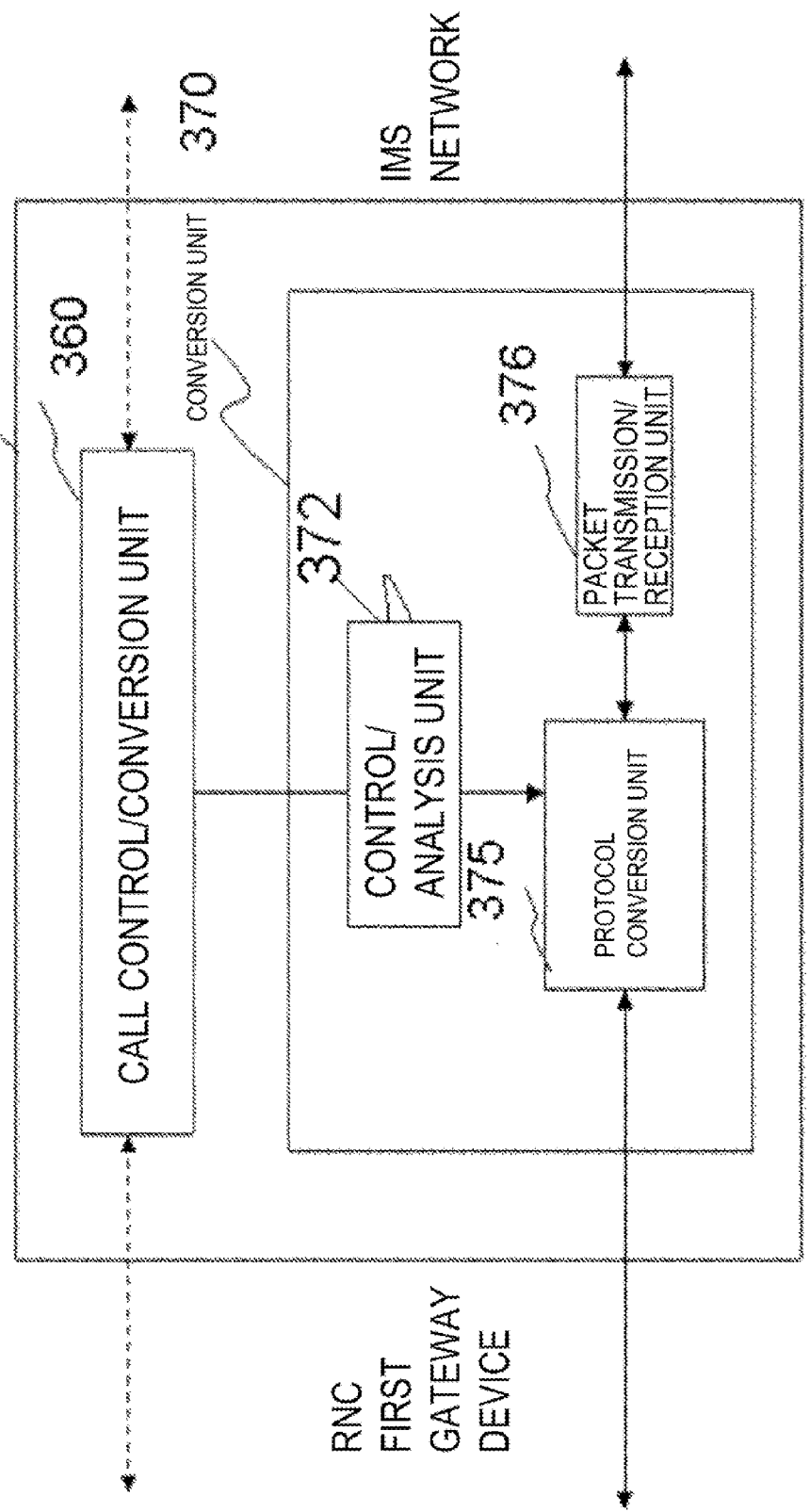
FIG. 7 is a diagram illustrating a configuration of a second gateway apparatus of the fourth exemplary embodiment of the present invention.

The following describes the second gateway apparatus 139 shown in FIG. 4. FIG. 7 is a diagram showing a configuration of the second gateway apparatus 139. The second gateway apparatus 139 can be any apparatus capable of achieving interconnection of voice communication between the mobile circuit switched network 130 and the IMS network 131. In the present invention, it is not limited to the configuration shown in FIG. 7.

With reference to FIG. 7, the second gateway apparatus 139, which is arranged between the mobile circuit switched network 130 and the IMS network 131 and interconnects voice communication therebetween, comprises a call control/conversion unit 360 and a conversion unit 370. The call control/conversion unit 360 receives a call control signal (for instance SIP (Session Initiation Protocol) and SDP (Session Description Protocol)) from the IMS network 131, converts the signal into a circuit switched call control signal, and outputs the converted signal to the radio network controller (RNC) 138 and the first gateway apparatus 110 on the mobile circuit switched network 130. The call control/conversion unit 360 also converts a circuit switched call control signal received from the radio network controller (RNC) 138 or the first gateway apparatus 110 on the mobile circuit switched network 130 into, for instance, a SIP or SDP signal, and outputs the converted signal to the IMS network 131. As for details of SIP and SDP, reference can be made to, for instance, IETF (The Internet Engineering Task Force) RFC 3261 and RFC 2327, respectively.

The call control/conversion unit 360 may be configured to receive information regarding the location of the mobile terminal 155 connected to the IMS network 131 (including a mobile terminal connected to another mobile circuit switched network connected via a gateway apparatus (not shown in the drawing) on the side of the IMS network 131) and determine whether or not the IP address of a packet of a corresponding channel transmitted from the second gateway apparatus 139 to the IMS network 131 changes due to movement of the mobile terminal 155. When the IP address of the packet of the corresponding channel changes, the call control/conversion unit 360 outputs an instruction to change the receiver IP address to the packet transmission/reception unit 376.

The call control/conversion unit 360 outputs predetermined information from information included in the call control signal received from the radio network controller (RNC) 138 or the first gateway apparatus 110 on the mobile circuit switched network 130 and information included in the call control signal (SIP or SDP) received from the IMS network 131 to the control/analysis unit 372 in the conversion unit 370 on a per channel basis.

The control/analysis unit 372 compares the information fro each channel received from the call control/conversion unit 360, and determines whether or not the protocol conversion is necessary. When the protocol conversion is necessary, the control/analysis unit 372 outputs conversion information indicating what kind of conversion is to be performed to the protocol conversion unit 375 on a per channel basis. The protocol conversion unit 375 receives the IuUP circuit switching protocol from the mobile circuit switched network 130 and reads a compression-encoded audio bit stream stored in the protocol. Here, it is supposed that the compression-encoded audio bit stream is a bit stream compression-encoded in accordance with AMR.

Further, the protocol conversion unit 375 receives the conversion information from the control/analysis unit 372 on a per channel basis, and when the protocol conversion is needed, the protocol conversion unit 375 constructs an RTP (Real-time Transport Protocol) payload format header according to IETF RFC 3267, for instance, on a per channel basis according to the conversion information and stores the AMR compression-encoded bit stream in the payload portion. Here, since frame type information included in the AMR compression-encoded audio bit stream indicates a bit rate, the protocol conversion unit 375 converts it into the codec mode request (CMR) information of RFC 3267. The protocol conversion unit 375 sets octet alignment and other parameters required by RFC 3267 to predetermined values.

The packet transmission/reception unit 376 receives the RTP payload format information from the protocol conversion unit 375' and stores it in the RTP packet. When the IP address is changed due to movement of the terminal, the packet transmission/reception unit 376 receives a changed IP address from the control/analysis unit 372, while using the same IP address, when the IP address does not change, and transmits an RTP/UDP (User Datagram Protocol)/IP (Internet Protocol) to the said IP address.

The call control/conversion unit 360 receives information regarding the location of the mobile terminal 155 connected to a mobile circuit switched network (not shown in the drawing) interconnected to the IMS network 131 via a gateway apparatus (not shown in the drawing) and determines whether or not a source node's IP address of a packet of a corresponding channel received from the side of the IMS network 131 changes due to movement of the mobile terminal 155. When the source node's IP address changes, the call control/conversion unit 360 outputs an instruction to change the source IP address to the packet transmission/reception unit 376. The packet transmission/reception unit 376 receives a packet from the IMS network 131. When the source node's IP address changes due to movement of the mobile terminal 155, the packet transmission/reception unit 376 receives a changed IP address, and receives an RTP/UDP/IP packet after switching the route of a destination node.

Then the RTP packet received by the packet transmission/reception unit 376 is supplied to the protocol conversion unit 375, which outputs the packet to the radio network controller (RNC) 138 and the first gateway apparatus 110 on the mobile circuit switched network 130. In FIG. 7, an audio codec may be provided between the protocol conversion unit 375 and the packet transmission/reception unit 376. Further, in FIG. 7, there is omitted an SN/TS changing unit that holds a preceding SN (Sequence Number) or TS Time Stamp), receives a movement completion notification from the control/analysis unit 372, when a terminal moves thereby changing the IP address, and that changes (replaces) SN or TS, if necessary, after the movement completion notification so that SN or TS of an RTP packet sent to a different IP address at the time of the movement completion notification continuously varies without going back in time and becoming older than or having the same value as the aforementioned SN or TS held. Further, a jitter buffer unit that receives an RTP packet from the packet transmission/reception unit 376 and that eliminates jitter (a variation of delay) from the RTP packet is omitted as well.

According to the present invention, voice communication between a mobile terminal connected to a gateway apparatus (the second gateway apparatus) interconnecting a mobile circuit switched network and an IMS network and a terminal connected to a femtocell access point, HNB, or HeNB, and voice communication with at least one of these terminals can be made possible, and interconnection of voice communication between any combination of connections can be achieved without remodeling the terminals.

According to the present invention, even in a case where the terminals use different in audio compression-encoding schemes (audio codecs), by having the gateway apparatus perform conversion of the audio compression-encoding scheme, the interconnection of voice communication can be realized without remodeling the terminals.

According to the present invention, by adding security processing to packetizing processing within the gateway apparatus on the mobile high-speed network side, the security function can be enhanced, and secure and reliable communication can be achieved.

The disclosure of each Patent Document is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

The whole or part of the exemplary embodiments disclosed above can be described as, but not limited to, the following Supplementary notes.

(Supplementary Note 1)
A gateway apparatus that connects an access point installed to a circuit switching equipment on a mobile circuit switched network to perform voice communication, wherein gateway apparatus receives at least one of a call control signal and a packet that has voice data stored therein in a predetermined protocol or payload format from the access point, converts at least one of the protocol of the call control signal and/or the protocol or payload format of the packet into the same protocol as a circuit switched protocol used when a radio network controller (RNC) connects to the circuit switch equipment, for output to the circuit switching equipment, receives at least one of a call processing signal that uses a protocol same as a protocol which is used when the circuit switching equipment outputs to the radio network controller and a voice signal that uses the same protocol, and converts at least one of the protocols of the call processing signal and the voice signal received, for output to the access point.

(Supplementary Note 2)
The gateway apparatus according to Supplementary note 1, comprising a conversion unit that converts an audio compression encoding scheme of a voice signal.

(Supplementary Note 3)
The gateway apparatus according to Supplementary note 1 or 2, including means that strengthens a security function in order to exchange packets with the mobile high-speed network.

(Supplementary Note 4)
The gateway apparatus according to any one of Supplementary notes 1 to 3, wherein the access point on the mobile high-speed network includes at least one of the following: a femtocell, Home NodeB, and Home eNodeB.

(Supplementary Note 5)
The gateway apparatus according to any one of Supplementary notes 1 to 4, further comprising a call control/conversion unit and a conversion unit, wherein the conversion unit comprises a control/analysis unit, a protocol conversion unit, and a packetizing unit, wherein the call control/conversion unit converts a call control signal that is received from a circuit switching equipment on a mobile circuit switched network and is used to connect to a radio network controller (RNC) into a call control signal of the access point, for output to the access point, receives a call control signal from the access point, converts the protocol of the signal into the same protocol as the protocol used when the radio network controller connects to the circuit switch equipment, for output to the circuit switch equipment, and outputs information from information included in the call control signal received from the access point and information included in the call control signal received from the access point, in association with a channel, to the control/analysis unit, the control/analysis unit receives the information from the call control/conversion unit on a per channel basis, determines whether or not protocol conversion is necessary, and outputs conversion information defining conversion contents to the protocol conversion unit on a per channel basis when the protocol conversion is necessary, the protocol conversion unit performs conversion between a circuit switching protocol frame from the circuit switching equipment and the protocol or the payload format of the packet from the access point according to the conversion information, and the packetizing unit receives payload format information from the protocol conversion unit and packetizes and outputs the information.

(Supplementary Note 6)
A gateway method performing voice communication by connecting an access point installed to a circuit switching equipment on a mobile circuit switched network, wherein the method comprises:

receiving at least one of a call control signal of a predetermined protocol and a packet that has voice data stored therein in a predetermined protocol or payload format from the access point;

converting at least one of a protocol of the call control signal and a protocol or payload format of the packet into the same protocol as a circuit switched protocol used when a radio network controller (RNC) connects to the circuit switch equipment, for output to the circuit switching equipment on the mobile circuit switched network;

receiving at least one of a call processing signal using a protocol being same as a protocol used when the circuit switching equipment outputs to the radio network controller and a voice signal that uses the same protocol from the circuit switching equipment on the mobile circuit switched network; and converting at least one protocol of the call processing signal and the voice signal received for output to the access point.

(Supplementary Note 7)
The gateway method according to Supplementary note 6, comprising converting an audio compression encoding scheme of a voice signal.

(Supplementary Note 8)
The gateway method according to Supplementary note 6 or 7, comprising strengthening a security function in order to exchange packets with the mobile high-speed network.

(Supplementary Note 9)
A program (a computer-readable storage medium storing the program) causing a computer constituting a gateway apparatus that connects an access point installed to a circuit switching equipment on a mobile circuit switched network to perform voice communication to execute the processing comprising:

receiving at least one of a call control signal and a packet that has voice data stored therein in a predetermined protocol or payload format from the access point;

converting at least one of a protocol of the call control signal and a protocol or payload format of the packet into the same protocol as a circuit switched protocol used when a radio network controller (RNC) connects to the circuit switch equipment, for output to the circuit switching equipment;

receiving at least one of a call processing signal that uses a protocol same as a protocol which is used when the circuit switching equipment outputs to the radio network controller and a voice signal that uses the same protocol; and converting at least one protocol of the call processing signal and the voice signal received, for output to the access point.

(Supplementary Note 10)

The program (a computer-readable storage medium storing the program) according to Supplementary note 9 causing the computer to execute a processing oft converting an audio compression encoding scheme of a voice signal.

(Supplementary Note 11)

The program according to Supplementary note 9 or 10 causing the computer to execute a processing of enhanceing a security function in order to exchange packets with the mobile high-speed network.

(Supplementary Note 12)

A gateway apparatus connecting a femtocell access point, Home NodeB, or Home eNodeB to a second gateway apparatus interconnecting a mobile circuit switched network and an IMS (IP Multimedia Subsystem) network, wherein the gateway apparatus receives at least one of a call control signal and a packet that has voice data stored therein in a predetermined protocol or payload format from the femtocell access point, Home NodeB, or Home eNodeB;

converts at least one of the call control signal, the protocol, and the payload format when determining that at least one of the call control signal, the protocol, and the payload format needs to be converted; outputting the result to the second gateway apparatus in the same protocol as a circuit switched protocol used when a radio network controller (RNC) connects to the second gateway apparatus;

receives at least one of a call processing signal that uses a protocol same as a protocol which is used when the second gateway apparatus outputs to the radio network controller (RNC) and a voice signal stored using the same protocol from the second gateway apparatus;

converts at least one protocol of the call control signal and the voice signal received when determining that at least one of the protocols of the call control signal and the voice signal needs to be converted, for output to the access point, the Home NodeB, or the Home eNodeB.

(Supplementary Note 13)

The gateway apparatus according to Supplementary note 12, comprising a conversion unit that converts an audio compression encoding scheme of a voice signal.

(Supplementary Note 14)

The gateway apparatus according to Supplementary note 12 or 13, including means for strengthening a security function in order to exchange packets with the mobile high-speed network.

(Supplementary Note 15)

A server apparatus functioning as the gateway apparatus according to any one of Supplementary notes 12 to 14.

(Supplementary Note 16)

A gateway method wherein a gateway apparatus that connects a femtocell access point, Home NodeB, or Home eNodeB to a second gateway apparatus interconnecting a mobile circuit switched network and an IMS (IP Multimedia Subsystem) network, wherein the method comprises:

receiving at least one of a call control signal and a packet that has voice data stored therein in a predetermined protocol or payload format from the femtocell access point, the Home NodeB, or the Home eNodeB;

converting at least one of the call control signal, the protocol, and the payload format when determining that at least one of the call control signal, the protocol, and the payload format needs to be converted, for output to the second gateway apparatus in the same protocol as a circuit switched protocol used when a radio network controller (RNC) connects to the second gateway apparatus;

receiving at least one of a call processing signal that uses a protocol same as a protocol which is used when the second gateway apparatus outputs to the radio network controller (RNC) and a voice signal stored using the same protocol from the second gateway apparatus;

converting at least one protocol of the call control signal and the voice signal received when determining that at least one of the protocols of the call control signal and the voice signal needs to be converted, for output to the access point, the Home NodeB, or the Home eNodeB.

(Supplementary Note 17)

The gateway method according to Supplementary note 16, comprising a conversion unit that converts an audio compression encoding scheme of a voice signal.

(Supplementary Note 18)

The gateway method according to Supplementary note 16 or 17, including means for strengthening a security function in order to exchange packets with the mobile high-speed network.

(Supplementary Note 19)

A program (a computer-readable storage medium storing the program) causing a computer constituting a gateway apparatus or server apparatus connecting a femtocell access point, Home Node B, or Home eNodeB to a second gateway apparatus interconnecting a mobile circuit switched network and an IMS (IP Multimedia Subsystem) network to execute the processing comprising:

receiving at least one of a call control signal and a packet that has voice data stored therein in a predetermined protocol or payload format from the access point, the Home NodeB, or the Home eNodeB;

converting at least one of the call control signal, the protocol, and the payload format when determining that at least one of the call control signal, the protocol, and the payload format needs to be converted, for output to the second gateway apparatus in the same protocol as a circuit switched protocol used when a radio network controller (RNC) connects to the second gateway apparatus;

receiving at least one of a call processing signal that uses a protocol same as a protocol which is used when the second gateway apparatus outputs to the radio network controller (RNC) and a voice signal stored using the same protocol from the second gateway apparatus; and converting at least one of the protocols of the call control signal and the voice signal received when determining that at least one of the protocols of the call control signal and the voice signal needs to be converted, for output to the access point, the Home NodeB, or the Home eNodeB.

(Supplementary Note 20)

The program (a computer-readable storage medium storing the program) according to Supplementary note 19 causing the computer to execute a processing of converting an audio compression encoding scheme of a voice signal.

(Supplementary Note 21)
The program according to Supplementary note 19 or 20 causing the computer to execute a processing of strengthening a security function in order to exchange packets with the mobile high-speed network.

(Supplementary Note 22)
A gateway apparatus connecting a femtocell access point, Home NodeB, or Home eNodeB connected to a mobile high-speed network to a second gateway apparatus interconnecting a mobile circuit switched network and an IMS (IP Multimedia Subsystem) network, wherein the gateway apparatus connects the femtocell access point, Home NodeB, or Home eNodeB to the second gateway apparatus after performing protocol conversion thereon so that the femtocell access point, Home NodeB, or Home eNodeB operates in the same manner as a radio network controller (RNC) on the mobile circuit switched network from the perspective of the second gateway apparatus on the mobile circuit switched network; and realizes interconnection of voice communication between a first terminal connected to the femtocell access point, Home NodeB, or Home eNodeB, a second terminal connected to the second gateway apparatus via the radio network controller (RNC) on the mobile circuit switched network, and a third terminal connected to the second gateway apparatus via the IMS network.

(Supplementary Note 23)
The gateway apparatus according to Supplementary note 22, wherein the gateway apparatus receiving at least one of a call control signal of a predetermined protocol and a packet that has voice data stored therein in a predetermined protocol or payload format from the femtocell access point, Home NodeB, or Home eNodeB over a bearer in the mobile high-speed network, converts at least one of the protocol of the call control signal and the protocol or the payload format of the packet received into a mobile circuit switched protocol when determining the conversion is necessary, for output to the second gateway apparatus;

receives at least one of a call processing signal of the mobile circuit switched protocol and a voice signal of the mobile circuit switched protocol from the second gateway apparatus;

converts at least one protocol of the call processing signal and the voice signals when determining that the conversion is necessary, for output to the femtocell access point, or Home NodeB connected to the mobile high-speed network over a bearer in the mobile high-speed network.

(Supplementary Note 24)
A gateway method by a first gateway apparatus connecting a femtocell access point, Home NodeB, or Home eNodeB connected to a mobile high-speed network to a second gateway apparatus interconnecting a mobile circuit switched network and an IMS (IP Multimedia Subsystem) network, wherein the method comprises:

the first gateway apparatus connecting the femtocell access point, Home NodeB, or Home eNodeB to the second gateway apparatus after performing protocol conversion thereon so that the femtocell access point, Home NodeB, or Home eNodeB operates in the same manner as a radio network controller (RNC) on the mobile circuit switched network from the perspective of the second gateway apparatus on the mobile circuit switched network; and realizing interconnection of voice communication between a first terminal connected to the femtocell access point, Home NodeB, or Home eNodeB, a second terminal connected to the second gateway apparatus via the radio network controller (RNC) on the mobile circuit switched network, and a third terminal connected to the second gateway apparatus via the IMS network.

(Supplementary Note 25)
The gateway method according to Supplementary note-24, comprising the first gateway apparatus receiving at least one of a call control signal of a predetermined protocol and a packet that has voice data stored therein in a predetermined protocol or payload format from the femtocell access point, Home NodeB, or Home eNodeB over a bearer in the mobile high-speed network;

the first gateway apparatus converting at least one of the protocol of the call control signal and the protocol or the payload format of the packet received into a mobile circuit switched protocol when determining the conversion is necessary, for output to the second gateway apparatus; and the first gateway apparatus receiving at least one of a call processing signal of the mobile circuit switched protocol and a voice signal of the mobile circuit switched protocol from the second gateway apparatus;

the first gateway apparatus converting at least one protocol of the call processing signal and the voice signal when determining that the conversion is necessary, for output to the femtocell access point, or Home NodeB connected to the mobile high-speed network over a bearer in the mobile high-speed network.

(Supplementary Note 26)
A network system comprising:

a second gateway apparatus that interconnects a mobile circuit switched network and an IMS (IP Multimedia Subsystem) network; and a first gateway apparatus that connects a femtocell access point, Home NodeB, or Home eNodeB connected to a mobile high-speed network to the second gateway apparatus, after performing protocol conversion thereon so that the femtocell access point, Home NodeB, or Home eNodeB operates in the same manner as a radio network controller (RNC) on the mobile circuit switched network from the perspective of the second gateway apparatus on the mobile circuit switched network, wherein the system realizes interconnection of voice communication between a first terminal connected to the femtocell access point, Home NodeB, or Home eNodeB, a second terminal connected to the second gateway apparatus via the radio network controller (RNC) on the mobile circuit switched network, and a third terminal connected to the second gateway apparatus via the IMS network.

(Supplementary Note 27)
The network system according to Supplementary note 26, wherein the first gateway apparatus receives at least one of a call control signal of a predetermined protocol and a packet that has voice data stored therein in a predetermined protocol or payload format from the femtocell access point, Home NodeB, or Home eNodeB over a bearer in the mobile high-speed network;

converts at least one of the protocol of the call control signal and the protocol or the payload format of the packet received into a mobile circuit switched protocol when determining the conversion is necessary, for output to the second gateway apparatus, and receives at least one of a call processing signal of the mobile circuit switched protocol and a voice signal of the mobile circuit switched protocol from the second gateway apparatus, and converts at least one protocol of the call processing signal and the voice signal when determining that the conversion is necessary, for output to the femtocell access point, or Home NodeB connected to the mobile high-speed network over a bearer in the mobile high-speed network.

The invention claimed is:

1. A gateway apparatus that connects an access point to a preset node on a mobile circuit switched network to perform mutual communication, said gateway apparatus comprising
a conversion section that receives at least one of a call control signal and a packet that has voice data stored therein in a predetermined protocol or payload format from said access point, and
converts at least one of a protocol of said call control signal and a protocol or a payload format of said packet into a protocol being same as a circuit switched protocol which is used when a radio network controller (RNC) on said mobile circuit switched network connects to said preset node, for output to said preset node,
said conversion section receiving at least one of a call processing signal that uses a protocol being same as a protocol which is used when said preset node outputs to said radio network controller, and a voice signal that uses said same protocol, and converting at least one protocol of said call processing signal and said voice signal received, for output to said access point,
wherein the preset node includes a second gateway apparatus that interconnects the mobile circuit switched network and an IMS (IP Multimedia Subsystem) network,
wherein the gateway apparatus and the second gateway apparatus interconnect a terminal connected to the access point and a terminal connected to the IMS network,
wherein, when no conversion is needed, the conversion section is configured to receive a circuit switching protocol frame, which is a circuit switched protocol, from the second gateway apparatus and to place the circuit switching protocol frame on an Realtime Transport Protocol/User Datagram Protocol (RTP/UDP) packet, and
wherein, when conversion is needed, the conversion section is further configured to receive conversion instructions on a per channel bases, to convert the circuit switching protocol frame into a Realtime Transport Protocol (RTP) payload format by reading a compression-encoded audio bit stream stored in an Radio Access Bearer (RAB) SubFlow of the payload of an IuUP protocol frame, to construct an RTP payload format header on a per channel basis according to the conversion information, and to store the compression-encoded bit stream in an RTP payload portion.

2. The gateway apparatus according to claim 1, wherein said preset node includes at least one of a circuit switching equipment provided on said mobile circuit switched network.

3. The gateway apparatus according to claim 1, wherein said conversion section includes
an audio transcoder unit that converts an audio compression encoding scheme of a voice signal.

4. The gateway apparatus according to claim 1, where said conversion section comprises
a security processing unit connected via a mobile network to said access point, said security processing unit performing security processing on a packet exchanged with said mobile network.

5. The gateway apparatus according to claim 1, wherein said access point includes at least one of a femtocell, Home NodeB, and Home eNodeB.

6. The gateway apparatus according to claim 1, wherein the conversion section converts a protocol output by the access point into a same protocol as one output by the RNC.

7. A network system comprising:
an access point; and
a gateway apparatus that connects said access point to a preset node on a mobile circuit switched network to perform mutual communication, wherein said gateway apparatus includes
a conversion section that receives at least one of a call control signal and a packet that has voice data stored therein in a predetermined protocol or payload format from said access point, and
converts at least one of a protocol of said call control signal and a protocol or payload format of said packet into the a protocol being same as a circuit switched protocol which is used when a radio network controller (RNC) on said mobile circuit switched network, connects to said preset node, for output to said preset node, said conversion section receiving at least one of a call processing signal that uses a protocol same as a protocol which is used when said preset node outputs to said radio network controller and a voice signal that uses said same protocol, and converting at least one protocol of said call processing signal and said voice signal received, for output to said access point,
wherein the preset node includes a second gateway apparatus that interconnects the mobile circuit switched network and an IMS (IP Multimedia Subsystem) network,
wherein the gateway apparatus and the second gateway apparatus interconnect a terminal connected to the access point and a terminal connected to the IMS network,
wherein, when no conversion is needed, the conversion section is configured to receive a circuit switching protocol frame, which is a circuit switched protocol, from the second gateway apparatus and to place the circuit switching protocol frame on an Realtime Transport Protocol/User Datagram Protocol (RTP/UDP) packet, and
wherein, when conversion is needed, the conversion section is further configured to receive conversion instructions on a per channel bases, to convert the circuit switching protocol frame into a Realtime Transport Protocol (RTP) payload format by reading a compression-encoded audio bit stream stored in an Radio Access Bearer (RAB) SubFlow of the payload of an IuUP protocol frame, to construct an RTP payload format header on a per channel basis according to the conversion information, and to store the compression-encoded bit stream in an RTP payload portion.

8. The network system according to claim 7, wherein said preset node includes at least one of a circuit switching equipment provided on said mobile circuit switched network.

9. The network system according to claim 7, wherein said access point includes at least one of a femtocell, Home NodeB, and Home eNodeB.

10. A gateway method by a gateway apparatus that connects an access point to a preset node on a mobile circuit switched network to perform mutual communication, said method comprising:
receiving at least one of a call control signal and a packet that has voice data stored therein in a predetermined protocol or payload format from said access point; and
converting at least one of a protocol of said call control signal and a protocol or payload format of said packet into a protocol being same as a circuit switched protocol which is used when a radio network controller (RNC) on said mobile circuit switched network connects to said preset node, for output to said preset node, said method further comprising:

receiving at least one of a call processing signal using a protocol being same as a protocol used when said preset node outputs to said radio network controller and a voice signal that uses said same protocol; and converting at least one protocol of said call processing signal and said voice signal received, for output to said access point, wherein the preset node includes a second gateway apparatus interconnecting the mobile circuit switched network and an IMS (IP Multimedia Subsystem) network, wherein the gateway apparatus and the second gateway apparatus interconnect a terminal connected to the access point and a terminal connected to the IMS network, wherein, when no conversion is needed, the gateway apparatus receives a circuit switching protocol frame, which is a circuit switched protocol, from the second gateway apparatus and places the circuit switching protocol frame on an Realtime Transport Protocol/User Datagram Protocol (RTP/UDP) packet, and wherein, when conversion is needed, the gateway apparatus receives conversion instructions on a per channel bases, to convert the circuit switching protocol frame into a Realtime Transport Protocol (RTP) payload format by reading a compression-encoded audio bit stream stored in an Radio Access Bearer (RAB) SubFlow of the payload of the an IuUP protocol frame, to construct an RTP payload format header on a per channel basis according to the conversion information, and to store the compression-encoded bit stream in an RTP payload portion.

11. The gateway method according to claim 10, wherein said preset node includes at least one of a circuit switching equipment provided on said mobile circuit switched network.

* * * * *